Jan. 15, 1952  J. A. HENDEL  2,582,249
FLEXIBLE COUPLING
Filed Jan. 7, 1948
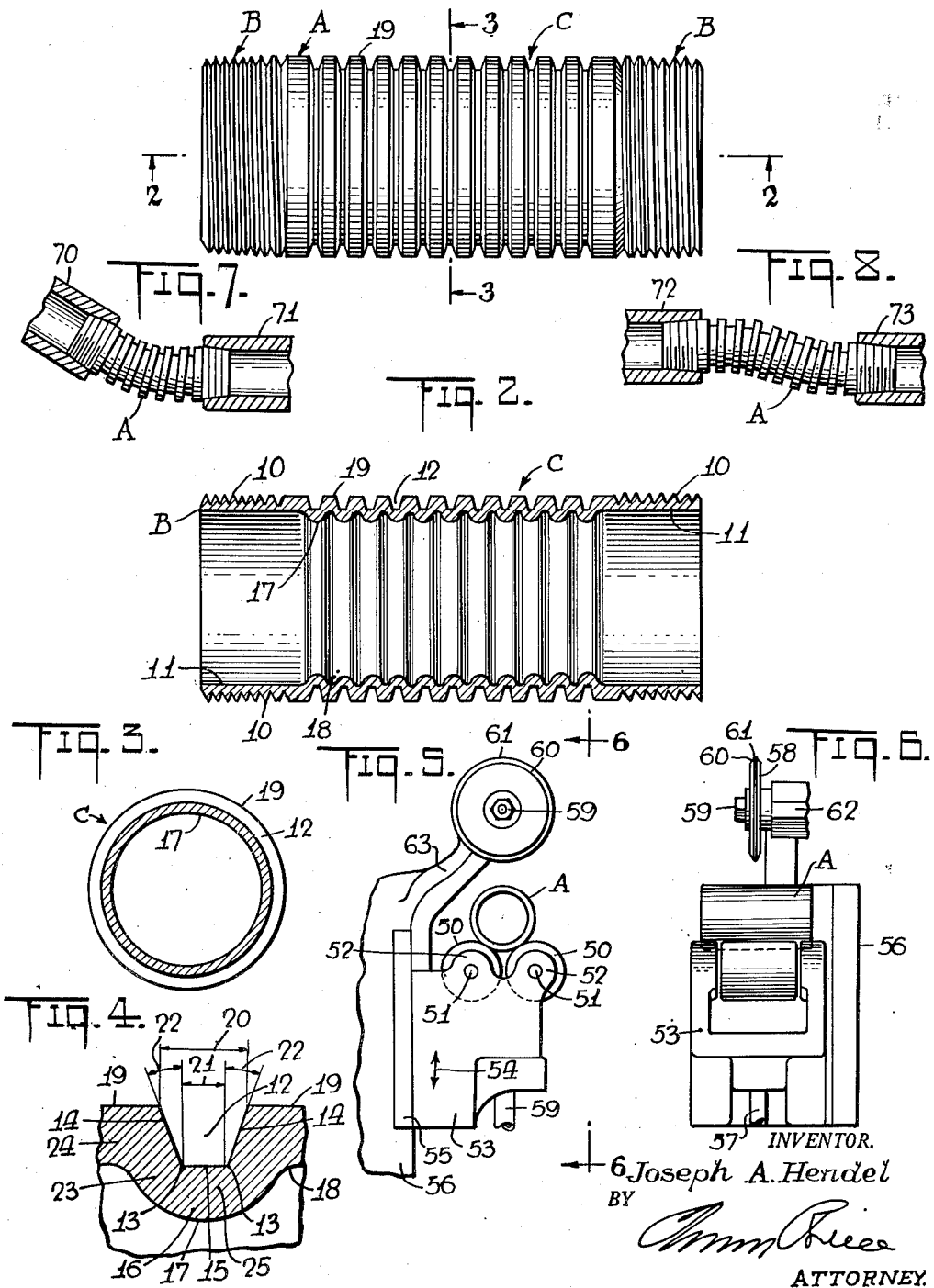
INVENTOR.
Joseph A. Hendel
BY
ATTORNEY.

Patented Jan. 15, 1952

2,582,249

UNITED STATES PATENT OFFICE 2,582,249

FLEXIBLE COUPLING

Joseph A. Hendel, Queens Village, N. Y.

Application January 7, 1948, Serial No. 881

2 Claims. (Cl. 285—90)

The present invention relates to a flexible coupling and it particularly relates to a flexible coupling which may be used in plumbing for connecting either liquid or gas lines.

It is among the objects of the present invention to provide a novel flexible coupling of the character described which may be utilized for conveniently connecting together liquid or gas lines and which will permit of and accommodate slight misalignments and enable most convenient and ready connection between adjacent pipe ends or tube ends which have not been exactly axially aligned.

Another object is to provide a novel procedure for rapidly manufacturing flexible couplings of the character described which will enable relatively high speed production at low cost on readily available machinery.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above object it has been found most satisfactory, according to one embodiment of the present invention to provide a short length of tubing of relatively pliable and malleable material such as 85% or 99% copper, brass, aluminum, wrought iron, Monel metal and so forth. The material should be of such a character to stand considerable deformation without cracking.

Desirably the ends of the length of the tubing may be pipe threaded interiorly or exteriorly and a substantial length of the tube between these threaded portions is interiorly and exteriorly ridged.

Desirably no metal is cut away from the tube between the threaded end portions and it has been found most satisfactory in one embodiment to provide relatively sharp V-shaped ridges exteriorly of the tube and relatively shallow curved sinuous ridges interiorly of the tube.

The invention also consists in certain new and original features of construction and combination of parts hereinafter set forth and claimed and as to its other objects, features and advantages, the mode of operation and manner of its organization, these, inter alia, may be better understood by referring to the following description considered in connection with the accompanying drawings forming a part thereof in which:

Fig. 1 is a side elevational view of a short length of flexible tubing according to the present invention;

Fig. 2 is a transverse, longitudinal sectional view taken upon the line 2—2 of Fig. 1;

Fig. 3 is a transverse vertical sectional view upon the line 3—3 of Fig. 1;

Fig. 4 is a fragmentary diagrammatic vertical sectional view upon an enlarged scale, as compared to Figs. 2 and 3, showing the details of the cross sectional shape and size of the inside and outside ridges;

Fig. 5 is a diagrammatic side elevational view of one type of machine which may be utilized for carrying out the process of the present invention;

Fig. 6 is an end elevational view of the present invention upon the lines 6—6 of Fig. 5; and Figs. 7 and 8 are diagrammatic side longitudinal sectional views indicating the manner in which the pipe elements of Figs. 1 and 2 may connect misaligned conduits or out of alignment conduits.

Referring to Fig. 1, the tubing A has the pipe threads B for connection to the out of alignment or misaligned conduits or tubings and it has an intermediate section C carrying the ridges 17 and 19 and grooves 12 and 18 which are formed without cutting away the metal and by deforming the middle section C.

Referring particularly to Fig. 2, the end sections B are shown as having an external pipe thread 10 and an internal smooth surface 11. It is obvious that other threads than pipe threads 10 may be employed, such as machine threads, and such threads may be applied to the interior and exterior of the tube or to both.

The ridges in the intermediate section C are best shown in Fig. 4 and it will be noted that the exterior ridge 12 has the sharp corners 13, the sloping sides 14 and the flat bottom 15. The interior ridge 16 has the rounded peak 17 and the rounded valleys 18.

Although the dimensions may widely vary with copper tubing having a wall thickness of $\frac{1}{16}$" and an inside diameter of 4½ to 4¾ inches, the maximum with of the external groove 12 or ridge 19 may be $\frac{1}{16}$" while its minimum width may be $\frac{3}{32}$" with a depth of about ½ the wall thickness or about $\frac{1}{16}$ to $\frac{3}{32}$ inches. The preferred angle of the sides 14 as indicated at 22 will be about 70 degrees.

It will be noted that although there is an area of minimum wall thickness at 23, the average thickness throughout will be substantially uniform with the thickness at the valleys 18 between the peaks 19 being substantially the same as the thickness between the valleys 16 and the peaks 17. Although the ridges and peaks in the intermediate portion C may be formed in different manners, it has been found most satisfactory to form them by a mechanism as indicated in Figs. 5 and 6.

In Figs. 5 and 6 the section of pipe A is placed between the rollers 50 mounted on the trunnions 51. The trunnions are mounted in the ears 52. The rollers 50 are carried by the vertical reciprocable block 53, which reciprocates in the section 54 having the slide bearings 55 upon the frame 56. The member 53 is reciprocated upwardly and downwardly in vertical direction by a cam (not shown).

The forming wheel 58 turns freely on the axis 59 and it has the sloping sides 60 and the flat edge 61 respectively corresponding to the side and bottom portions 14 and 15 of the groove 12.

The axle 59 is mounted upon the carrier washer 62 which is carried by the arm 63 from the machine structure 57. In operation the yoke or frame 53 will reciprocate at intervals while the wheel 58 will remain fixed and the pipe A will be deformed as shown in Figs. 1 to 4.

After each deformation the pipe may be advanced the distance between the middle of the grooves 12 automatically or by hand.

If desired the pipe may be advanced continuously so as to give a continuous spiral groove 12 without cutting and in some instances the thread may be continued on the to the end portions B of the tubing A to give a complete thread extending from one end of the tube A to the other end.

In Figs. 7 and 8 are shown pipe sections 70 and 71 which will be slightly misaligned angularly, while in Fig. 8 are shown two pipe sections which are slightly misaligned laterally. The tube A is shown as making the connection between these pipe connections.

After forming the copper tube it is annealed by being heated to a cherry red heat and then dipped into water to anneal it.

As many changes could be made in the above flexible coupling and many apparently widely different embodiments of this invention could be made without departing from the scope of the claims, it is intended that all matter contained in the above description or shown in the accompanying drawings shall be interpreted as illustrative and not in a limiting sense.

Having now particularly described and ascertained the nature of the invention, and in what manner the same is to be performed, what is claimed is:

1. A tubing connection of limited flexibility for use in plumbing in connection with liquid or gas lines to permit of and accommodate slight misalignments and enable ready connection between adjacent tubing ends comprising threaded end portions and a relatively thick-walled corrugated intermediate section, the corrugations including external grooves of truncated V-shaped formation with the bottoms of said grooves being flat and the sloping side walls of said grooves being straight in cross section, the internal ribs corresponding to said grooves being rounded in cross section.

2. A tubing connection of the construction set forth in claim 1, further characterized in that the internal ribs and the grooves formed therebetween constitute a surface that is sinusoidal in cross section.

JOSEPH A. HENDEL.

REFERENCES CITED

The following references are of record in the file of this patent:

UNITED STATES PATENTS

| Number | Name | Date |
|---|---|---|
| 282,967 | Duffy | Aug. 14, 1883 |
| 414,767 | Fox | Nov. 12, 1889 |
| 436,463 | Richard | Sept. 16, 1890 |
| 689,688 | Nodder | Dec. 24, 1901 |
| 798,448 | Pogany et al. | Aug. 29, 1905 |
| 1,833,319 | Damsel | Nov. 24, 1931 |
| 1,911,775 | Smith | May 30, 1933 |
| 1,977,175 | Davis | Oct. 16, 1934 |
| 2,000,680 | Weatherhead | May 7, 1935 |